United States Patent [19]

McVey

[11] Patent Number: 5,789,454
[45] Date of Patent: Aug. 4, 1998

[54] SILICONE SURFACTANT COMPOSITIONS USEFUL IN INERT GAS BLOWN POLYURETHANE FOAMS

[75] Inventor: Susan B. McVey, Charleston, W. Va.

[73] Assignee: OSi Specialties, Inc., Danbury, Conn.

[21] Appl. No.: 695,902

[22] Filed: Aug. 12, 1996

[51] Int. Cl.$^6$ .................................................. C08G 18/00
[52] U.S. Cl. ............................................ 521/112; 521/111
[58] Field of Search ................................. 521/112, 111

[56] References Cited

U.S. PATENT DOCUMENTS

| | | | |
|---|---|---|---|
| 2,834,748 | 5/1958 | Bailey et al. | |
| 2,917,480 | 12/1959 | Bailey et al. | |
| 3,184,419 | 5/1965 | Merriman. | |
| 3,505,377 | 4/1970 | Morehouse et al. | 260/448.2 |
| 3,637,541 | 1/1972 | Rossmy et al. | 260/215 H |
| 3,980,784 | 9/1976 | Peterson | 424/273 |
| 4,042,540 | 8/1977 | Lammerting et al. | 260/2.5 AH |
| 4,529,143 | 7/1985 | Kanada et al. | 242/107 |
| 4,814,409 | 3/1989 | Blevins, II et al. | 521/112 |
| 4,855,329 | 8/1989 | Blevins, II et al. | 521/112 |
| 4,857,583 | 8/1989 | Austin et al. | 521/112 |
| 5,001,248 | 3/1991 | Grabowski | 556/456 |
| 5,120,770 | 6/1992 | Doyle et al. | 521/99 |
| 5,145,879 | 9/1992 | Budnik et al. | 521/112 |
| 5,489,617 | 2/1996 | Miller et al. | |
| 5,525,640 | 6/1996 | Gerkin et al. | 521/112 |

FOREIGN PATENT DOCUMENTS 0 645 266 A2   9/1994   European Pat. Off..

*Primary Examiner*—Morton Foelak
*Attorney, Agent, or Firm*—Scully, Scott, Murphy & Presser

[57] ABSTRACT

Disclosed is a method of using inert gas as an auxiliary blowing agent in the production of flexible polyurethane foams, in the presence of a blend of a silicone surfactant stabilizer and a second silicone compound. The disclosed method provides better stabilization of the foams made by such processes. Also disclosed are foam formulations containing such blends.

47 Claims, No Drawings

SILICONE SURFACTANT COMPOSITIONS USEFUL IN INERT GAS BLOWN POLYURETHANE FOAMS

FIELD OF THE INVENTION

The present invention relates to the production of polyurethane foams.

BACKGROUND OF THE INVENTION

Historically, numerous grades of polyurethane foams were blown with chlorofluorocarbon (CFC) based blowing agents to reduce foam density, control foam firmness and to cool the foams to minimize discoloration, degradation and possible foam ignition problems. World-wide issues regarding ozone depletion in connection with certain CFCs has led to the Montreal Protocol, which phases out the production of CFCs.

Thus, the polyurethane foam industry has tried to achieve the same foam grades and quality produced using alternative blowing agents (ABAs). Many different ABAs have been evaluated including HCFC-141b, HFC-134a, HFC-22, alkyl carbonates and pentanes. In flexible slabstock foams in particular, other approaches have been taken, including the use of acetone, methylene chloride, carbon tetrachloride, trichloroethane, and pentanes as ABAs. While functional, these approaches also have problems including flammability (for acetone and pentanes) and toxicity (for the chlorocarbons).

More recently, a technology has been developed which entails the use of supplemental added inert gases, e.g., $CO_2$, as part of the blowing agent for flexible polyurethane foams, which is described e.g. in European Patent Publication No. 0 645 226 (hereinafter "Dissolved Gas Technology"). Some earlier patents disclosed the potential for $CO_2$ as a blowing agent, e.g. U.S. Pat. Nos. 3,184,419, 5,120,770 and 4,855,329. In the recently developed technology auxiliary gas is added to the system as a blowing agent and is used in conjunction with the $CO_2$ generated from the reaction of isocyanate with water. However, this prior art focuses on the details of a process for frothing a slabstock foam reaction mixture using liquid $CO_2$ with special equipment and does not teach what type of silicone stabilizers should be used therein.

The prior art teaches a myriad of stabilizers for use in polyurethane foams, but none, except U.S. Pat. No. 5,525,640, are directed to Dissolved Gas Technology, see U.S. Pat. Nos. 5,145,879 and 4,814,409. U.S. Pat. No. 5,525,640 teaches that silicone polyalkylene oxide polyether copolymer comb-type surfactants containing greater than 37% ethylene oxide in pendant polyethers cause large cells when added inert gas is used as a blowing agent. However the use of a surfactant containing less than 37% ethylene oxide in polyether pendants does not ensure fine cell structure in all foam grades.

SUMMARY OF THE INVENTION

One aspect of the present invention is a method of manufacturing polyurethane foam, comprising (a) providing a polyurethane foam formulation which contains (a) (i) a hydrolyzable or non-hydrolyzable silicone stabilizer which is effective as a surfactant and stabilizer in the production of flexible slabstock polyurethane foam and (a) (ii) a silicone polymer selected from the group consisting of (A) polydimethylsiloxanes of the formula $MD_{1-12}M$ wherein M is $(CH_3)_3Si-O_{1/2}$ and D is $O_{1/2}-Si(CH_3)_2-O_{1/2}$ and blends thereof;

(B) low molecular weight silicone/polyether copolymers and blends thereof having the structure $MD_xD''_yM$ wherein M and D are as defined in (A) and D'' is $O_{1/2}-Si(CH_3)(R^E)-O_{1/2}$ wherein $R^E$ is a polyether moiety, x=1 to 3, y=0.5 to 2, and the polyether component is derived from $CH_2=CR^6CH_2O(C_2H_4O)_hX$, where $R^6=CH_3$ or hydrogen, X=methyl, $COCH_3$, or H, and h=2 to 5;

(C) compounds and blends thereof having the structure $MD'_yM$ wherein M is as defined above, y is 1–14 and D' is $O_{1/2}-Si(CH_3)(R^c)-O_{1/2}$ wherein the $R^c$ groups are straight or branched alkyl groups containing from 2 to 12 carbon atoms;

(D) medium molecular weight silicone/polyether copolymers having the structure $MDxD''yM$, wherein x=5 to 40, y=5 to 15, and M, D, and D'' are as defined above; and mixtures thereof; and (b) blowing said formulation with a dissolved pressurized inert gas to supplement gases generated during the normal foaming reaction with water.

In a preferred aspect of this method, the polyurethane foam formulation contains the silicone stabilizer (a)(i) and the silicone polymer (a)(ii) and also contains a polyether polyol containing an average of more than two hydroxyl groups per molecule, an organic diisocyanate, at least one catalyst for production of polyurethane foam, and water. Such formulations constitute another aspect of the present invention.

What has been discovered and is disclosed herein is that blends of the indicated silicone stabilizers with a second silicone polymer not normally useful in flexible slabstock foam are efficient at capturing and holding gas in Dissolved Gas Technology foam formulations, a necessity for such foams. Surprisingly, it was discovered that the silicone stabilizers blended with a second silicone polymer consistently gave lower froth densities in a froth test, which correlates to urethane foams with finer cell structure than either of the silicone components alone.

DETAILED DESCRIPTION OF THE INVENTION

The Silicone Surfactant Component

The silicones which comprise the silicone stabilizer component useful in the present invention include any which are effective as surfactant stabilizers in the production of flexible slabstock polyurethane foam, particularly including those conventionally used to make flexible slabstock polyurethane foam without supplemental inert gases such as $CO_2$. Examples of silicone stabilizers that are effective in such applications abound and are well known to those skilled in the art. Useful silicones in this regard include those disclosed in U.S. Pat. Nos. 2,834,748; 2,917,480; 3,637,541; 3,505,377; 3,980,784; 4,529,143; 4,814,409; 4,855,329; 4,857,583; 5,489,617; and 5,525,640; the disclosures of all of which are hereby incorporated herein by reference.

The silicone stabilizers useful in this regard in the present invention include hydrolyzable silicone-polyether block copolymers (i.e. those characterized by bonding of the polysiloxane moiety to the polyoxyalkylene moiety through Si—O—C bonds) and non-hydrolyzable silicone-polyether block copolymers (i.e. those characterized by bonding of the polysiloxane moiety to the polyoxyalkylene moiety through Si—C bonds). The silicone stabilizers may be designed with flame-retardant characteristics for use in flame retardant foam compositions.

One type of preferred silicone stabilizers have polydimethylsiloxane backbones with attached polyalkylene oxide polyether pendant groups, i.e., "comb" copolymers. The Si—C bonds in these copolymers are hydrolytically stable, and many of these surfactants can be used in water amine premixes.

Of the many classes of silicone stabilizers useful in this invention, one class is silicone/polyether compositions having the following generalized average formula

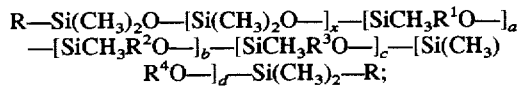

or

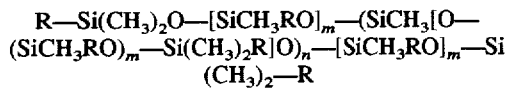

or

where: each $R^1$, $R^2$ and $R^3$ group is a polyalkylene oxide polyether of the formula $-B-C_nH_{2n}O-(C_2H_4O)_e-(C_3H_6O)_f(C_4H_8O)_gZ$, where the average molecular weight of all $R^1$ groups present is in the range 3000 to 6000 g/mole and ethylene oxide (EO) is 20–60 weight percent of the alkylene oxide content of the $R^1$ groups present;the average molecular weight of all $R^2$ groups present is in the range 800 to 2900 g/mole and EO is 20–60 weight percent of the alkylene oxide content of the $R^2$ groups present; the average molecular weight of all $R^3$ groups present is in the range 130 to 800 g/mole and EO is 5 to 100% by weight of the alkylene oxide content of the $R^3$ groups present; each $R^4$ is an alkyl or aryl group of $C_1$ to $C_{12}$, B is derived from an unsaturated hydrocarbon moiety capable of undergoing hydrosilylation, each $R^5$ is a polyalkylene oxide polyether group of the formula $-O_{1/2}-C_nH_{2n}O-(C_2H_4O)_j-(C_3H_6O)_j(C_4H_8O)_k Z$, each R is selected from $CH_3$, $R^1$, $R^2$, $R^3$ or $R^4$; v is in the range 1–4, u is in the range 3v to 36v, x is in the range 40–200; a+b+c+d=y, where b or c (but not both) may be 0, d/(a+b+c)=0 to 1, a+b>0, y is in the range 5 to 40; m=10 to 100; n≦4; Z represents —H, an alkyl or aralkyl group of 1–8 carbon atoms, —C(O)Z', —C(O)OZ'or —C(O)NHZ'; Z' represents a mono-functional alkyl or aryl group of 1 to 8 carbon atoms; e, f and g are defined by the molecular weight required by the polyether; i, j, and k are each at least 0; and i+j+k is at least 5. In a preferred embodiment the total EO content of the surfactant structure is less than 37% by weight of the surfactant.

$R^1$ contain preferably approximately 30–60% by weight of EO and most preferably about 40% EO. It is preferred that such moieties have average molecular weight greater than 3500 and especially preferably greater than 4000 daltons. $R^2$ are preferably approximately 30–60% by weight of EO and most preferably about 40% EO. It is preferred that such moieties have average molecular weight of approximately 1100–2300 and most preferably 1400–1600 daltons. $R^3$ preferably contain little or no propylene oxide residues (≦20 w/w %) and have average molecular weight in the range 300–750 daltons.

There may also be more than one different polyether from each group. For example, a copolymer may be composed of (a) two $R^1$-type polyethers differing in molecular weight and/or EO-content (e.g., 55% EO-4000MW and 44% EO-5500MW) and (b) an $R^2$-type polyether. In addition, butylene oxide may be substituted for propylene oxide in the polyether backbone. The polyether moieties may be linear or branched and may contain any number of carbon atoms.

The alkyl pendant groups ($R^4$) can be alkyl groups (1 to 12 carbon atoms), substituted alkyl groups (1 to 12 carbon atoms), aryl or alkaryl groups. Z is preferably $-C(O)CH_3$ or $CH_3$. B is preferably an allyl derivative, e.g., propyl or a methallyl derivative, e.g., isobutyl.

These silicone stabilizers can be synthesized by techniques known to those skilled in the art.

The Silicone Polymer Component

There are four basic classes of silicone polymers useful herein with the silicone stabilizer mentioned above, which are as follows:

Class A. Polydimethylsiloxanes of the formula $MD_1M$ to $MD_{12}M$ (where M is $(CH_3)_3Si-O_{1/2}$ and D is $O_{1/2}-Si(CH_3)_2-O_{1/2}$) as described in U.S. Pat. No. 4,042,540. These can be specific compounds corresponding to one specific structural formula, but more commonly are blends of polydimethylsiloxanes of the formula $MD_{1-12}M$. Preferred materials average 4.5 "D" units.

Class B. Low molecular weight silicone/polyether copolymers with a structure of $MD_xD"_yM$ (M and D are as above and D" is $O_{1/2}-Si(CH_3)(R^E)-O_{1/2}$ with $R^E$ a polyether moiety), where x ranges from 1 to 3, y ranges from 0.5 to 2 and the polyether component is derived from $CH_2=CR^6CH_2O(C_2H_4O)_hX$, where $R^6=CH_3$ or hydrogen, X=methyl, $COCH_3$, or H, and h=2 to 5. Blends of copolymers of this type are contemplated as well and are preferred. Said silicone/polyether copolymers are made as is known in the art.

Class C: Compounds and blends thereof, having the structure $MD'_yM$ wherein M is as defined above, y is 1–14 and D' is $O_{1/2}-Si(CH_3)(R^c)-O_{1/2}$ wherein the $R^c$ groups are straight or branched alkyl groups containing up to 12 carbon atoms and preferably up to 8 carbon atoms. Examples of such $R^c$ groups include 2-methylpropyl, 2-methylbutyl, 4-methylpentyl, 3,3-dimethylbutyl, 2,3-dimethylbutyl, and 3-methylbutyl. Compounds of this type are described in U.S. Pat. No. 5,001,248.

Class D: Medium molecular weight silicone/polyether copolymers with a typical structure of $MDxD"yM$, where x=5 to 40, y=5 to 15, and M, D, and D" are as defined above with respect to class B. It is to be understood that the silicone copolymer refers to a statistical distribution of molecular species distinct from that of the silicone stabilizer. A silicone copolymer of class D refers only to a copolymer that is prepared separately from and subsequently blended with the silicone stabilizer.

The use levels of these silicone polymers with the surfactants is not overly critical, but an amount effective to stabilize the foam made, i.e., an effective amount, should be used. Generally the range of use is from 0.01 to 1.00 part of silicone polymer to 1.0 part of silicone surfactant, by weight.

Polyurethane Foam

The silicone stabilizer/silicone polymer blend is to be used in a foam which is blown in accordance with Dissolved Gas Technology. The foam usually comprises (a) a polyether polyol containing an average of more than two hydroxyl groups per molecule; (b) an organic poly isocyanate; (c) at least one catalyst for production of polyurethane foam; (d) water; (e) a silicone stabilizer/silicone polymer blend as defined above; (f) an inert gas. Materials a, b, c, d and f are well known in the art, described e.g. in U.S. Pat. Nos. 4,814,409 and 4,855,329, which are incorporated herein by reference.

The polyols have an average number of hydroxyl groups per molecule of at least slightly above 2 and typically 2.1 to 3.5. Generally, the polyol should have an equivalent weight of about 400 to 1500 grams/equivalent and an ethylene oxide content of less than 20%. Useful polyols include but are not limited to polyether polyols such as alkylene oxide adducts of polyhydroxyalkanes, alkylene oxide adducts of non-reducing sugars and sugar derivatives, alkylene oxide adducts of polyphenols, and alkylene oxide adducts of polyamines and polyhydroxyamines. The alkylene oxides are preferably based on ethylene oxide or propylene oxide. The organic polyisocyanates contain at least two isocyanate groups, e.g., toluene diisocyanates (TDI), and the index of the foam is typically 60 to 130. The catalyst is usually an amine such as triethylene diamine and/or bis(2-dimethylaminoethyl) ether, and certain metal catalysts, including organic derivatives of tin, particularly tin compounds of octanoic acid or lauric acid. The catalyst is present in small but effective amounts typically on the order of 0.0001 to 5 weight percent. The water generally comprises on the order of 1 to 12 pphp (parts by weight per hundred parts of polyol). Other additives may be added to the polyurethane foam to impart specific properties to the foam, including, but not limited to, coloring agents, flame retardants, and GEOLITE® Modifier foam additives (available from OSi Specialties Group of Witco Corporation, Greenwich, Conn.). The inert gas is one which is soluble in the foam formulation at elevated pressures, but will come out of solution (i.e., blow) at atmospheric pressure. An exemplary such gas is $CO_2$, but nitrogen, air or other common gases, including hydrocarbon gases, such as methane and ethane may also be used.

The silicone stabilizer/silicone polymer blends should be of the type mentioned above and should be present in an amount effective to stabilize the polyurethane foam, i.e., an effective amount, which is generally about 0.05 to 5 wt. percent of the total reaction mixture, preferably 0.2 to 1.5 wt. percent.

The foam is manufactured by mixing the ingredients (that is, ingredients (a) through (f)) together and putting them under high pressure (i.e., at least greater than atmospheric pressures) so that the inert gas is dissolved in the reactant mixture. Then the mixture is flashed, by releasing the pressure, which causes the gas to form bubbles at nucleation sites in the foaming system and thus act as a blowing agent. This produces a reduced density foam. For a more complete description of the process and the equipment required therein, see European Patent Publication No. 0 645 226 A2, which is incorporated herein by reference.

The foam cell structure is uniform. Additionally, the foam cell size is consistently small (cells per cm) in these foams, i.e., greater than 7 cells per centimeter.

The polyurethanes produced in accordance with the present invention can be used in the same fields as conventional polyether polyurethanes. For example, the foams of the present invention can be used with advantage in the manufacture of textile interliners, cushions, mattresses, padding, carpet underlay, packaging, gaskets, sealers, thermal insulators and the like.

EXAMPLES

Examples 1-11

Several silicone stabilizer/silicone polymer blends were tested to determine if they would be acceptable in $CO_2$ blown polyurethane foam. A predictive test method, developed and described in U.S. Pat. No. 5,525,640, was one in which air was mechanically whipped with a conventional polyether polyol and the density of the resultant froth determined. Comparisons could then be made between various surfactants and blends based on their ability to produce a low density polyol froth. From this data, correlations could then be made with the performance of these surfactants and blends in polyurethane foams made using Dissolved Gas Technology.

The procedure was as follows: A 6 oz styrofoam cup (Dart # 6j6) was placed on a balance and tared to "zero". The cup was filled to the top (line of sight) with the polyol to be frothed and the weight was recorded. The polyol and surfactant or blend being evaluated were transferred to a mixing bowl and whipped for five minutes at maximum speed setting in a KITCHENAID Mixer, Model number KSM90, equipped with a number K45 stainless steel mixing bowl and a stainless steel wire whisk beater. Prior to performing this test surfactants were blended with polyol or other diluent to commercial use activity, that is, to 45–80% activity. This procedure is standard to assure low enough viscosity to afford good mixing. Then a new cup was placed on the balance, tared to zero and fresh froth was poured into the cup, filling it to the same level as before with the weight of the frothed mixture being recorded. The relative froth density was calculated as the weight of frothed mixture divided by weight of unfrothed mixture.

The polyol used was a 3000 molecular weight, secondary hydroxyl polyol with approximately 8% internal ethylene oxide. The silicone stabilizers (surfactants) used, where M, D, D' and D" are as above and R' is $R^1$, $R^2$, $R^3$ or $R^5$, were as follows:

Surfactant #1 =$MD_xD''_yM$, where R' is composed of three different acetoxy capped polyethers. Polyether a (m.w. 4000) and polyether b (m.w. 1500) were blended together to an average m.w. of 2100. This blend was then combined with polyether c (m.w. 550) at a ratio of [polyether a+polyether b] /polyether c of 1.6. The total EO content was 30% by weight.

Surfactant #2 =$MD_xD''_yM$, where R' was composed of two different acetoxy capped polyethers at a blended average molecular weight (BAMW) in g/mole of 1250 (with one polyether having a 4000 m.w. and the other a 550 m.w.), and the total EO content is 38% by weight.

Surfactant #3 =$MD_xD''_yM$, where R' was composed of two different methyl capped polyethers at a BAMW of 2100 (with one polyether having 4000 m.w. and the other 1500 m.w.), and the total EO content was 22% by weight.

Surfactant #4 =$MD_xD''_yM$, where R' was composed of three different methyl capped polyethers. Polyether a (m.w. 4000) and polyether b (m.w. 1500) were blended to an average molecular weight of 3100. This blend was then combined with polyether c (m.w. 350) at a ratio of [polyether a+polyether b] /polyether c of 1.05. The total EO content was 32%.

The ethylene oxide/propylene oxide content in all of the products discussed in this application were calculated using only the actual EO and PO content, i.e., capping and bridging groups were not included in the calculation.

Surfactant #5 =Hydrolyzable silicone polyether copolymer sold as Tegostab® B-2370 and available from Th. Goldschmidt AG.

In the following Examples specific silicone polymers are used, representing each of the four classes of silicone polymers previously described.

Class A is represented by additive A defined as: $MD_{1-12}M$, where the average number of "D" groups is 4.5.

Class B is represented by additive B defined as: $MD_{2.8}D'_{1.2}D$ where the pendant group is allyl methoxytriglycol.

Class C is represented by additive C defined as: $MD'_2M$, where pendent group $R^c$ is 4-methyl pentyl.

Class D is represented by additive D defined as: $MD_{40}D'_{11.5}M$, where the pendant group is a 750 molecular weight polyether containing 75% ethylene oxide and 25% propylene oxide.

Table 1 below shows the density reduction associated with the use of the four classes of silicone polymers ("Additives") with polyol when used alone, not in blends with silicone stabilizers, in the previously described "Froth Test". These data demonstrate that when the silicone polymer component is used alone, without the silicone stabilizer component of our invention, it does not stabilize the froth to a significantly greater extent than the silicone stabilizer (Table 2). This observation is important because it shows that the improvement in froth density upon adding a small amount of silicone polymer along with the silicone stabilizer according to our invention is greater than can be expected through additive contributions of the two components.

TABLE 1

Effect of Silicone Polymer Alone on Polyol Froth Density

| Example # | Additive | Use Level, php | Relative Froth Density |
|---|---|---|---|
| | None (Polyol alone) | — | 0.92 |
| 1 | A | 0.075 | 0.566 |
| 2 | A | 1.0 | 0.412 |
| 3 | B | 0.075 | 0.835 |
| 4 | B | 1.0 | 0.321 |
| 5 | C | 0.075 | 0.885 |
| 6 | D | 1.0 | 0.493 |

Table 2 shows the effect these silicone polymers have on the polyol froth density when used with one part of a silicone stabilizer (conventional silicone surfactant) in the Froth test. These data show that the presence of a relatively small amount of the silicone polymer component reduces the froth density compared to a froth made using the silicone stabilizer without the silicone polymer component.

TABLE 2

Effect of Additive/Conventional Surfactant Blend on Polyol Froth Density, 1.0 part conventional surfactant/100 parts polyol

| | | Use level, | Froth Density | | | | |
|---|---|---|---|---|---|---|---|
| Ex | Additive | php | Surf #1 | Surf #2 | Surf #3 | Surf #4 | Surf #5 |
| | None (Surfactant only) | — | 0.524 | 0.779 | 0.563 | 0.466 | 0.591 |
| 7 | A | 0.075 | 0.376 | 0.692 | 0.391 | 0.344 | 0.371 |
| 8 | B | 0.075 | 0.450 | — | — | — | — |
| 9 | B | 1.00 | 0.313 | — | — | — | — |
| 10 | C | 0.075 | 0.457 | — | — | — | — |
| 11 | D | 1.00 | 0.380 | — | — | — | — |

Examples 12–18—Laboratory scale trials
The foam test formulation was as follows:

| | php[1] |
|---|---|
| Polyol (Arcol polyol 16–56) | 100 |
| Water | 5.5 |
| Methylene Chloride | 10 |
| Niax Amine Catalyst A-200 | 0.2 |
| Stannous Octoate | 0.23 |
| Toluene Diisocyanate | 112 |
| Surfactant/Additive | See Table 3 |

[1]php - parts per hundred parts polyol

Lab foams were made according to a standard foam making technique which is known to those skilled in the art.

Table 3 shows the utility of these binary blends of silicone stabilizer ("Surfactant") and silicone polymer ("Additive") in an otherwise conventional foam formulation. The use of the silicone polymer alone does not stabilize flexible foam as demonstrated in examples 15–18. In conventional laboratory scale foam there is no notable effect on cell structure. However, Table 4 shows the improved cell structure obtained when using one of these blends in full scale production foams made with carbon dioxide added as a blowing agent. Therefore, the data from Table 3 coupled with the correlation between the froth data from Table 2 and carbon dioxide blown foam from Table 4 indicate the utility of these binary blends for cell structure improvement with an unexpected increase in foam height which would correlate to reduced average foam density in carbon dioxide blown polyurethane foams.

TABLE 3

Foam Performance of Additive/Conventional Surfactant Blend in Flexible Foam Formulation Defined Above

| Example | Surfactant #1, php[1] | Additive A, php | Additive B, php | Settle % | Rise (cm) | Number Cells/inch |
|---|---|---|---|---|---|---|
| 12 | 1.0 | 0 | 0 | 3.3 | 36.31 | 40–50 |
| 13 | 1.0 | 0.075 | 0 | 3.7 | 37.56 | 40–50 |
| 14 | 1.0 | 0 | 0.075 | 2.6 | 38.39 | 40–50 |
| 15 | 0 | 0.075 | 0 | 100 | 0 | X[2] |
| 16 | 0 | 0 | 0.075 | 100 | 0 | X |
| 17 | 0 | 1.0 | 0 | 100 | 0 | X |
| 18 | 0 | 0 | 1.0 | 100 | 0 | X |

[1]php = parts of surfactant, per 100 parts of polyol
[2]X = cells per inch not measured because foam collapsed Examples 19–20—$CO_2$ blown foam production line trials

TABLE 4

Foam Performance of Additive/Conventional Surfactant Blend in Production Scale Flexible Foam Defined Below[2]

| Example | Surfactant #1 php[1] | Additive A php | Number Cells/inch |
|---|---|---|---|
| 19 | 1.2 | 0 | 12 |
| 20 | 1.2 | 0.2 | 19 |

[1]php = parts of surfactant, per 100 parts of polyol
[2]Full scale production foam made with carbon dioxide with foam density of 1.1 pounds per cubic foot and a 25% IFD of about 25 pounds/50 square inches

What is claimed is:

1. A method of manufacturing polyurethane foam comprising
   (a) providing a polyurethane foam formulation which comprises (a) (i) a silicone stabilizer that is effective as a surfactant and stabilizer in the production of flexible slabstock polyurethane foam and which has a structure selected from the following generalized structures:

(a-i-a) R—Si(CH$_3$)$_2$O—(Si(CH$_3$)$_2$O—)$_x$—(SiCH$_3$R$^1$O—)$_a$—(SiCH$_3$R$^2$O—)$_b$—(SiCH$_3$R$^3$O—)$_c$—(Si(CH$_3$)R$^4$O—)$_d$—Si(CH$_3$)$_2$—R; or (a-i-b) R—Si(CH$_3$)$_2$O—(SiCH$_3$RO)$_m$—(SiCH$_3$(O—(SiCH$_3$RO)$_m$—Si(CH$_3$)$_2$R)O)$_n$—(SiCH$_3$RO)$_m$—Si(CH$_3$)$_2$—R; or (a-i-c) (R—SiO$_{3/2}$)$_v$(OSi(CH$_3$)$_2$)$_u$R$^5$$_{(2+v)}$ where: each R$^1$, R$^2$ and R$^3$ group is a polyalkylene oxide polyether of the formula —B—C$_n$H$_{2n}$O—(C$_2$H$_4$O)$_e$—(C$_3$H$_6$O)$_f$(C$_4$H$_8$O)$_g$Z, where the average molecular weight of all R$^1$ groups present is in the range 3000 to 6000 g/mole and ethylene oxide (EO) is 20–60 weight percent of the alkylene oxide content of the R$^1$ groups present;; the average molecular weight of all R$^2$ groups present is in the range 800 to 2900 g/mole and EO is 20–60 weight percent of the alkylene oxide content of the R$^2$ groups present; the average molecular weight of all R$^3$ groups present is in the range 130 to 800 g/mole and EO is 5 to 100% by weight of the alkylene oxide content of the R$^3$ groups present; each R$^4$ is an alkyl or aryl group of Cl to C$_{12}$, B is derived from a moiety capable of undergoing hydrosilylation, each R$^5$ is a polyalkylene oxide polyether of the formula —O—C$_n$H$_{2n}$O—(C$_2$H$_4$O)$_i$—(C$_3$H$_6$O)$_j$(C$_4$H$_8$O)$_k$Z, each R is selected from CH$_3$, R$^1$, R$^2$, R$^3$ or R$^4$, provided that in structure (a-i-b) at least one R is selected from R$^1$, R$^2$ or R$^3$, v is in the range 1–4, u is in the range 3v to 36v, x is from 40 to 200; a+b+c+d=y, where b or c (but not both) may be 0, d/(a+b+c)=0 to 1, a+b >0, y ranges from 5 to 40; m ranges from 10 to 100; 1≦n≦4; each Z represents —H, an alkyl or aralkyl group of 1–8 carbon atoms, —C(O)Z', —C(O)OZ' or —C(O)NHZ'; each Z' represents a mono-functional alkyl or aryl group of 1 to 8 carbon atoms; e, f and g are defined by the molecular weight required by the polyether; i, j, and k are each at least 0; and i+j+k is at least 5; and (a)(ii) a silicone polymer selected from the group consisting of (A) polydimethylsiloxanes of the formula MD$_{1-12}$M wherein M is (CH$_3$)$_3$Si—O$_{1/2}$ and D is O$_{1/2}$—Si(CH$_3$)$_2$—O$_{1/2}$ and blends thereof;

(B) low molecular weight silicone/polyether copolymers and blends thereof having the structure MD$_x$D"$_y$M wherein M and D are as defined in (A) and D" is O$_{1/2}$—Si(CH$_3$)(R$^E$)—O$_{1/2}$ wherein R$^E$ is a polyether moiety, x=1 to 3, y=0.5 to 2, and the polyether moiety is derived from CH$_2$=CR$^6$CH$_2$O(C$_2$H$_4$O)$_h$X, where R$^6$=CH$_3$ or hydrogen, X=methyl, COCH$_3$, or H, and h=2 to 5;

(C) compounds and blends thereof having the structure MD'$_y$M wherein M is as defined above, y is 1–14 and D' is O$_{1/2}$—Si(CH$_3$)(R$^c$)—O$_{1/2}$ wherein each R$^c$ group is a straight or branched alkyl group containing up to 12 carbon atoms;

(D) medium molecular weight silicone/polyether copolymers having the structure MDxD"yM, wherein x=5 to 40, y=5 to 15, and M, D, and D" are as defined above; and mixtures thereof; and (b) blowing said formulation with a dissolved pressurized inert gas to supplement gases generated during the normal foaming reaction with water.

2. A method for producing polyurethane foam, comprising (a) providing a polyurethane foam formulation which comprises (a) (i) a silicone stabilizer that is effective as a surfactant and stabilizer in the production of flexible slabstock polyurethane foam and which has a structure selected from the following generalized structures:

(a-i-a) R—Si(CH$_3$)$_2$O—(Si(CH$_3$)$_2$O—)$_x$—(SiCH$_3$R$^1$O—)$_a$—(SiCH$_3$R$^2$O—)$_b$—(SiCH$_3$R$^3$O—)$_c$—(Si(CH$_3$)R$^4$O—)$_d$—Si(CH$_3$)$_2$—R, or (a-i-b) R—Si(CH$_3$)$_2$O—(SiCH$_3$RO)$_m$—(SiCH$_3$(O—(SiCH$_3$RO)$_m$—Si(CH$_3$)$_2$R)O)$_n$—(SiCH$_3$RO)$_m$—Si(CH$_3$)$_2$—R; or (a-i-c) (R—SiO$_{3/2}$)$_v$(OSi(CH$_3$)$_2$)$_u$R$^5$$_{(2+v)}$ where: each R$^1$, R$^2$ and R$^3$ group is a polyalkylene oxide polyether of the formula —B—C$_n$H$_{2n}$O—(C$_2$H$_4$O)$_e$—(C$_3$H$_6$O)$_f$(C$_4$H$_8$O)$_g$Z, where the average molecular weight of all R$^1$ groups present is in the range 3000 to 6000 g/mole and ethylene oxide (EO) is 20–60 weight percent of the alkylene oxide content of the R$^1$ groups present; ; the average molecular weight of all R$^2$ groups present is in the range 800 to 2900 g/mole and EO is 20–60 weight percent of the alkylene oxide content of the R$^2$ groups present; the average molecular weight of all R$^3$ groups present is in the range 130 to 800 g/mole and EO is 5 to 100% by weight of the alkylene oxide content of the R$^3$ groups present; each R$^4$ is an alkyl or aryl group of Cl to C$_{12}$, B is derived from a moiety capable of undergoing hydrosilylation, each R$^5$ is a polyalkylene oxide polyether of the formula —O—C$_n$H$_{2n}$O—(C$_2$H$_4$O)$_i$—(C$_3$H$_6$O)$_j$(C$_4$H$_8$O)$_k$Z, each R is selected from CH$_3$, R$^1$, R$^2$, R$^3$ or R$^4$, provided that in structure (a-i-b) at least one R is selected from R$^1$, R$^2$ or R$^3$, v is in the range 1–4, u is in the range 3v to 36v, x is from 40 to 200; a+b+c+d=y, where b or c (but not both) may be 0, d/(a+b+c)=0 to 1, a+b >0, y ranges from 5 to 40; m ranges from 10 to 100; 1≦n≦4; each Z represents —H, an alkyl or aralkyl group of 1–8 carbon atoms, —C(O)Z', —C(O)OZ' or —C(O)NHZ'; each Z' represents a mono-functional alkyl or aryl group of 1 to 8 carbon atoms; e, f and g are defined by the molecular weight required by the polyether; i, j, and k are each at least 0; and i+j+k is at least 5;

(a) (ii) a silicone polymer selected from the group consisting of (A) polydimethylsiloxanes of the formula MD$_{1-12}$M wherein M is (CH$_3$)$_3$Si—O$_{1/2}$ and D is $_{1/2}$—Si(CH$_3$)$_2$—O$_{1/2}$ and blends thereof;

(B) low molecular weight silicone/polyether copolymers and blends thereof having the structure MD$_x$D"$_y$M wherein M and D are as defined in (A) and D" is O$_{1/2}$—Si(CH$_3$)(R$^E$)—O$_{1/2}$ wherein R$^E$ is a polyether moiety, x=1 to 3, y=0.5 to 2, and the polyether moiety is derived from CH$_2$=CR$^6$CH$_2$O(C$_2$H$_4$O)$_h$X, where R$^6$=CH$_3$ or hydrogen, X=methyl, COCH$_3$, or H, and h=2 to 5;

(C) compounds and blends thereof having the structure MD'$_y$M wherein M is as defined above, y is 1–14 and D' is O$_{1/2}$—Si(CH$_3$)(R$^c$)—O$_{1/2}$ wherein each R$^c$ group is a straight or branched alkyl group containing up to 12 carbon atoms;

(D) medium molecular weight silcone/polyether copolymers having the structure MDxD"yM, wherein x=5 to 40, y=5 to 15, and M, D, and D" are as defined above; and mixtures thereof;

(a) (iii) a polyether polyol containing an average of more than two hydroxyl groups per molecule;

(a)(iv) an organic diisocyanate;
(a) (v) at least one catalyst for production of polyurethane foam; and
(a) (vi) water; and
(b) blowing said formulation with a dissolved pressurized inert gas to supplement gases generated during the normal foaming reaction with water.

3. A flexible slabstock polyurethane foam formulation comprising
(i) a silicone stabilizer that is effective as a surfactant and stabilizer in the production of flexible slabstock polyurethane foam and which has a structure selected from the following generalized structures:

(i-a) R—Si(CH$_3$)$_2$O—(Si(CH$_3$)$_2$O—)$_x$—(SiCH$_3$R$^1$O—)$_a$—(SiCH$_3$R$^2$O—)$_b$—(SiCH$_3$R$^3$O—)$_c$—(Si(CH$_3$)R$^4$O—)$_d$—Si(CH$_3$)$_2$—R; or (i-b) R—Si(CH$_3$)$_2$O—(SiCH$_3$RO)$_m$—(SiCH$_3$(O—(SiCH$_3$RO)$_m$—Si(CH$_3$)$_2$R)O)$_n$—(SiCH$_3$RO)$_m$—Si(CH$_3$)$_2$—R; or (i-c) (R—SiO$_{3/2}$)$_v$(OSi(CH$_3$)$_2$)$_u$R$^5_{(2+v)}$ where: each R$^1$, R$^2$ and R$^3$ group is a polyalkylene oxide polyether of the formula —B—C$_n$H$_{2n}$O—(C$_2$H$_4$O)$_e$—(C$_3$H$_6$O)$_f$(C$_4$H$_8$O)$_g$Z, where the average molecular weight of all R$^1$ groups present is in the range 3000 to 6000 g/mole and ethylene oxide (EO) is 20–60 weight percent of the alkylene oxide content of the R$^1$ groups present;; the average molecular weight of all R$^2$ groups present is in the range 800 to 2900 g/mole and EO is 20–60 weight percent of the alkylene oxide content of the R$^2$ groups present; the average molecular weight of all R$^3$ groups present is in the range 130 to 800 g/mole and EO is 5 to 100% by weight of the alkylene oxide content of the R$^3$ groups present; each R$^4$ is an alkyl or aryl group of C$_1$ to C$_{12}$, B is derived from a moiety capable of undergoing hydrosilylation, each R$^5$ is a polyalkylene oxide polyether of the formula —O—C$_n$H$_{2n}$O—(C$_2$H$_4$O)$_i$—(C$_3$H$_6$O)$_j$(C$_4$H$_8$O)$_k$Z, each R is selected from CH$_3$, R$^1$, R$^2$, R$^3$ or R$^4$, provided that in structure (a-i-b) at least one R is selected from R', R$^2$ or R$^3$, v is in the range 1–4, u is in the range 3v to 36v, x is from 40 to 200; a+b+c+d=y, where b or c (but not both) may be 0, d/(a+b+c)=0 to 1, a+b >0, y ranges from 5 to 40; m ranges from 10 to 100; 1≦n≦4; each Z represents —H, an alkyl or aralkyl group of 1–8 carbon atoms, —C(O)Z', —C(O)OZ' or —C(O)NHZ'; each Z' represents a mono-functional alkyl or aryl group of 1 to 8 carbon atoms; e, f and g are defined by the molecular weight required by the polyether; i, j, and k are each at least 0; and i+j+k is at least 5;

(ii) a silicone polymer selected from the group consisting of
(A) polydimethylsiloxanes of the formula MD$_{1-12}$M wherein M is (CH$_3$)$_3$Si—O$_{1/2}$ and D is O$_{1/2}$—Si(CH$_3$)$_2$—O$_{1/2}$ and blends thereof;
(B) low molecular weight silicone/polyether copolymers and blends thereof having the structure MD$_x$D"$_y$M wherein M and D are as defined in (A) and D" is O$_{1/2}$—Si(CH$_3$)(R$^E$)—O$_{1/2}$ wherein R$^E$ is a polyether moiety, x=1 to 3, y=0.5 to 2, and the polyether moiety is derived from CH$_2$=CR$^6$CH$_2$O(C$_2$H$_4$O)$_h$X, where R$^6$=CH$_3$ or hydrogen, X=methyl, COCH$_3$, or H, and h=2 to 5;
(C) compounds and blends thereof having the structure MD'$_y$M wherein M is as defined above, y is 1–14 and D' is O$_{1/2}$—Si(CH$_3$)(R$^c$)—O$_{1/2}$ wherein each R$^c$ group is a straight or branched alkyl group containing up to 12 carbon atoms;
(D) medium molecular weight silicone/polyether copolymers having the structure MDxD"yM, wherein x=5 to 40, y=5 to 15, and M, D, and D" are as defined above; and mixtures thereof;
(iii) a polyether polyol containing an average of more than two hydroxyl groups per molecule;
(iv) an organic diisocyanate;
(v) at least one catalyst for production of polyurethane foam; and (vi) water.

4. A method according to claim 1 wherein the silicone stabilizer is selected from compounds having the following generalized structures:

(a) R—Si(CH$_3$)$_2$O—[Si(CH$_3$)$_2$O—]$_x$—[SiCH$_3$R$^1$O—]$_a$—[SiCH$_3$R$^2$O—]$_b$—[SiCH$_3$R$^3$O—]$_c$—[SiCH$_3$R$^4$O—]$_d$—Si(CH$_3$)$_2$—R, and (b) R—Si(CH$_3$)$_2$O—[SiCH$_3$RO]$_m$—(SiCH$_3$[O—(SiCH$_3$RO)$_m$—Si(CH$_3$)$_2$R]O)$_n$—[SiCH$_3$RO]$_m$—Si(CH$_3$)$_2$—R and having a total EO content of less than 37%.

5. A method according to claim 1 wherein EO is approximately 30–60% by weight of the alkylene oxide content of the R$^1$ groups present.

6. A method according to claim 1 wherein the average molecular weight of all R$^1$ groups present is greater than 3500 daltons.

7. A method according to claim 1 wherein EO is approximately 30–60% by weight of the alkylene oxide content of the R$^2$ groups present.

8. A method according to claim 1 wherein the average molecular weight of all R$^2$ groups present is approximately 1100–2300 daltons.

9. A method according to claim 1 wherein propylene oxide residues are not more than 20% by weight of the alkylene oxide content of the R$^3$ groups present.

10. A method according to claim 1 wherein the average molecular weight of all R$^3$ groups present is in the range 300–750 daltons.

11. A method according to claim 1 wherein each R$^4$ is an alkyl group of 1 to 12 carbon atoms, a substituted alkyl group of 1 to 12 carbon atoms, an aryl group or an alkaryl group.

12. A method according to claim 1 wherein each Z is —C(O)CH$_3$ or —CH$_3$.

13. A method according to claim 1 wherein each B is an allyl derivative or a methallyl derivative.

14. A method according to claim 1 wherein the silicone polymer is selected from group (A).

15. A method according to claim 1 wherein the silicone polymer is selected from group (B).

16. A method according to claim 1 wherein the silicone polymer is selected from group (C).

17. A method according to claim 1 wherein the silicone polymer is selected from group (D).

18. A method according to claim 1 wherein the foam is blown with carbon dioxide.

19. A method according to claim 1 wherein said silicone polymer is present in an amount of 0.01 to 1.00 part per 1.00 part of said silicone stabilizer, by weight.

20. A method according to claim 2 wherein the silicone stabilizer is selected from compounds having the following generalized structures:

(a) R—Si(CH$_3$)$_2$O—[Si(CH$_3$)$_2$O—]$_x$—[SiCH$_3$R$^1$O—]$_a$—[SiCH$_3$R$^2$O—]$_b$—[SiCH$_3$R$^3$O—]$_c$—[SiCH$_3$R$^4$O—]$_d$—Si(CH$_3$)$_2$—R, and (b) R—Si(CH$_3$)$_2$O—[SiCH$_3$RO]$_m$—(SiCH$_3$[O—(SiCH$_3$RO)$_m$—Si(CH$_3$)$_2$R]O)$_n$—[SiCH$_3$RO]$_m$—Si(CH$_3$)$_2$—R and having a total EO content of less than 37%.

21. A method according to claim 2 wherein EO is approximately 30–60% by weight of the alkylene oxide content of the $R^1$ groups present.

22. A method according to claim 2 wherein the average molecular weight of all $R^1$ groups present is greater than 3500 daltons.

23. A method according to claim 2 wherein EO is approximately 30–60% by weight of the alkylene oxide content of the $R^2$ groups present.

24. A method according to claim 2 wherein the average molecular weight of all $R^2$ groups present is approximately 1100–2300 daltons.

25. A method according to claim 2 wherein propylene oxide residues are not more than 20% by weight of the alkylene oxide content of the $R^3$ groups present.

26. A method according to claim 2 wherein the average molecular weight of all $R^3$ groups present is in the range 300–750 daltons.

27. A method according to claim 2 wherein each $R^4$ is an alkyl group of 1 to 12 carbon atoms, a substituted alkyl group of 1 to 12 carbon atoms, an aryl group or an alkaryl group.

28. A method according to claim 22 wherein each Z is —C(O)CH$_3$ or CH$_3$.

29. A formulation according to claim 3 wherein the silicone stabilizer is selected from compounds having the following generalized structures:

(a) R—Si(CH$_3$)$_2$O—[Si(CH$_3$)$_2$O—]$_x$—[SiCH$_3$R$^1$O—]$_a$—[SiCH$_3$R$^2$O—]$_b$—[SiCH$_3$R$^3$O—]$_c$—[SiCH$_3$R$^4$O—]$_d$—Si(CH$_3$)$_2$—R, and (b) R—Si(CH$_3$)$_2$O—[SiCH$_3$RO]$_m$—(SiCH$_3$[O—(SiCH$_3$RO)$_m$—[Si(CH$_3$)$_2$R]O)$_n$—SiCH$_3$RO]$_m$—Si(CH$_3$)$_2$—R and having a total EO content of less than 37%.

30. A formulation according to claim 3 wherein EO is approximately 30–60% by weight of the alkylene oxide content of the $R^1$ groups present.

31. A formulation according to claim 3 wherein the average molecular weight of all $R^1$ groups present is greater than 3500 daltons.

32. A formulation according to claim 3 wherein EO is approximately 30–60% by weight of the alkylene oxide content of the $R^2$ groups present.

33. A formulation according to claim 3 wherein the average molecular weight of all $R^2$ groups present is approximately 1100–2300 daltons.

34. A formulation according to claim 3 wherein propylene oxide residues are not more than 20% by weight of the alkylene oxide content of the $R^3$ groups present.

35. A formulation according to claim 3 wherein the average molecular weight of all $R^3$ groups present is in the range 300–750 daltons.

36. A formulation according to claim 3 wherein each $R^4$ is an alkyl group of 1 to 12 carbon atoms, a substituted alkyl group of 1 to 12 carbon atoms, an aryl group or an alkaryl group.

37. A formulation according to claim 3 wherein each Z is —C(O)CH$_3$ or CH$_3$.

38. A formulation according to claim 3 wherein B is an allyl derivative or methallyl derivative.

39. A formulation according to claim 3 wherein the silicone polymer is selected from group (A).

40. A formulation according to claim 3 wherein the silicone polymer is selected from group (B).

41. A formulation according to claim 3 wherein the silicone polymer is selected from group (C).

42. A formulation according to claim 3 wherein the silicone polymer is selected from group (D).

43. A formulation according to claim 3 wherein the foam is blown with carbon dioxide.

44. A formulation according to claim 3 wherein said silicone polymer is present in an amount of 0.01 to 1.00 part per 1.00 part of said silicone stabilizer, by weight.

45. Foam made using the method of claim 1.

46. Foam made using the method of claim 18.

47. Foam made using the method of claim 19.

* * * * *

UNITED STATES PATENT AND TRADEMARK OFFICE
CERTIFICATE OF CORRECTION

PATENT NO. : 5,789,454
DATED : August 4, 1998
INVENTOR(S) : Susan McVey

It is certified that error appears in the above-identified patent and that said Letters Patent are hereby corrected as shown below:

Column 9, Line 27, Claim 1: "C1" should read --$C_1$--

Column 10, Line 29, Claim 2: "C1" should read --$C_1$--

Signed and Sealed this

Tenth Day of April, 2001

Attest:

NICHOLAS P. GODICI

*Attesting Officer*  *Acting Director of the United States Patent and Trademark Office*